United States Patent [19]

Boulanger et al.

[11] Patent Number: 4,671,700
[45] Date of Patent: Jun. 9, 1987

[54] METHOD AND INSTALLATION FOR STORING LIQUID GAS AT LOW TEMPERATURE IN AN UNDERGROUND CAVITY

[75] Inventors: Alain Boulanger, Paris, France; Walter Luyten, Schoten, Belgium

[73] Assignees: Societe Francaise de Stockage Geologique, France; Geostock and Distrigaz, Belgium

[21] Appl. No.: 825,788

[22] Filed: Feb. 4, 1986

Related U.S. Application Data

[63] Continuation of Ser. No. 501,726, Jun. 6, 1983, abandoned.

[30] Foreign Application Priority Data

Jun. 17, 1982 [FR] France .................................. 82 10566

[51] Int. Cl.⁴ .............................................. B65G 5/00
[52] U.S. Cl. .......................................... 405/56; 405/55
[58] Field of Search ...................... 405/53, 55, 56, 57, 405/58, 130, 258, 270

[56] References Cited

U.S. PATENT DOCUMENTS

| 3,083,537 | 4/1963 | Dougherty | 405/56 |
| 3,333,421 | 8/1967 | Shock et al. | 405/56 |
| 4,165,945 | 8/1979 | Despois et al. | 405/55 |

FOREIGN PATENT DOCUMENTS

| 1252820 | 12/1960 | France . |
| 1278379 | 10/1961 | France . |
| 929609 | 6/1963 | United Kingdom | 405/56 |

Primary Examiner—David H. Corbin
Attorney, Agent, or Firm—Sughrue, Mion, Zinn, Macpeak and Seas

[57] ABSTRACT

The walls of the cavity (10) are interconnected by rounded portions. The cavity (10) may be cylindrical in shape with hemispherical ends (11, 12). This shape reduces cracking in the walls during an initial cavity cooling process.

4 Claims, 1 Drawing Figure

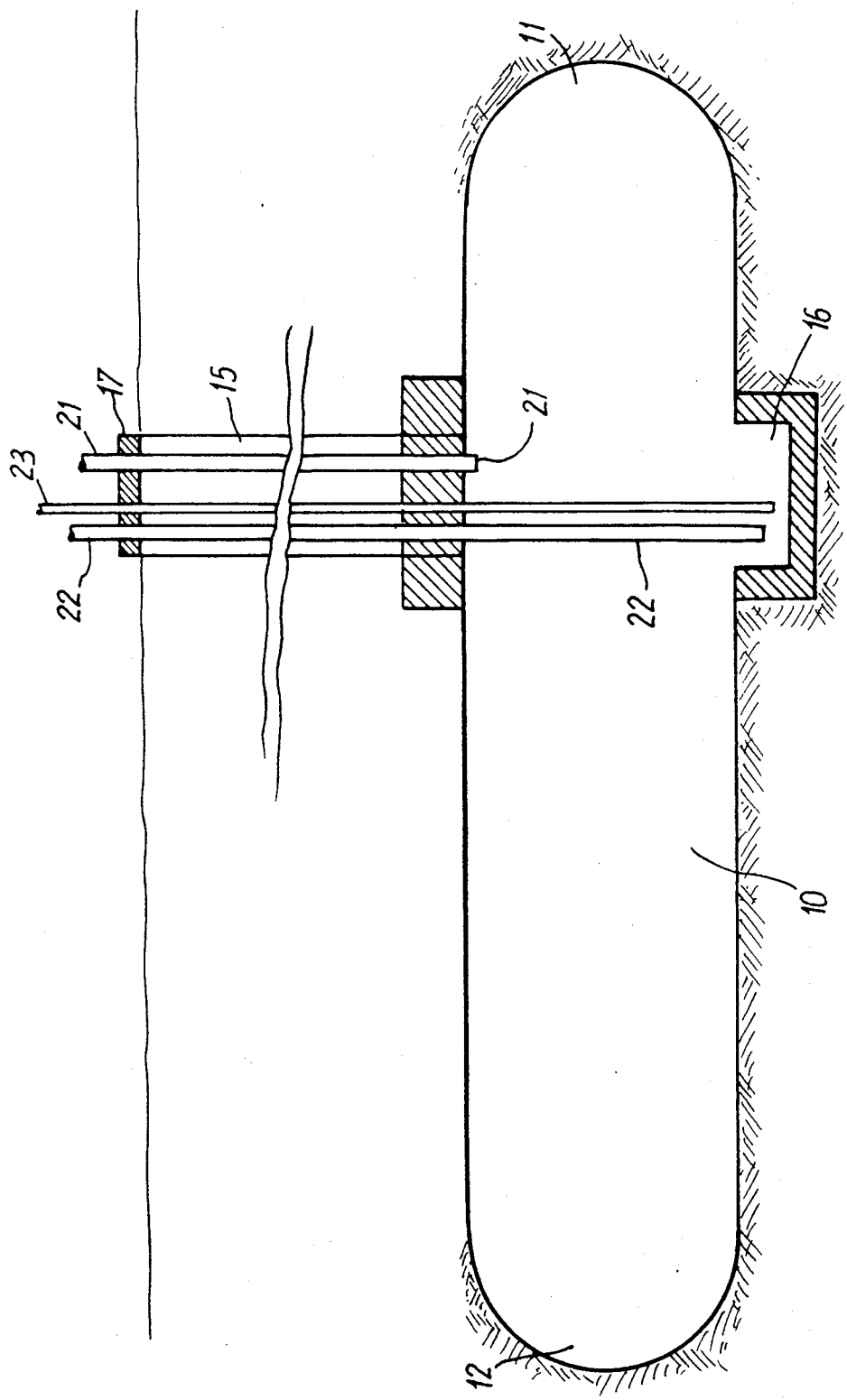

METHOD AND INSTALLATION FOR STORING LIQUID GAS AT LOW TEMPERATURE IN AN UNDERGROUND CAVITY

This is a continuation of application Ser. No. 501,726, filed June 6, 1983, now abandoned.

The present invention relates to underground storage of products maintained at low temperatures, i.e. cryogenic storage, and in particular to storing liquified hydrocarbons. The advantage is to be able to store the product at atmospheric pressure. The temperature is thus the gas/liquid equilibrium temperature at atmospheric pressure, which varies over the range −40° C. to −196° C. for the various gases obtained from hydrocarbon deposits.

BACKGROUND OF THE INVENTION

Various methods have been proposed for storing liquified gases, and in particular those gases, such as natural gas, which are liquified at very low temperature, in underground cavities which are made liquid-tight by the ground freezing. The liquified gas is then at about atmospheric pressure. Up to now such methods have encountered numerous difficulties, principally related to cracks which may be present in the ground before the cavity is dug or which may appear as the installation is being put into operation. Depending on circumstances, such cracks can lead either to ingress of water, which can be difficult to stop, particularly if it does not occur until after the cooling process has begun, i.e. at a time when working in the cavity is not intended, or else it can lead to gas leaking to the surface, and again such leaks are generally not detected until after the cooling process has begun, or indeed until after the installation has been put into operation.

Preferred implementations of the present invention provide a method and apparatus for storing liquified gas in an underground cavity which is sealed essentially by the ground freezing, but which avoid the drawbacks due to ingress of water or to gas leaking throughout the storage period.

In known methods, the walls of the cavity and the surrounding ground are kept under observation while the cavity is being cooled prior to filling, and during this period action is taken, when necessary, by modifying the initial cooling program and/or by reparing damage which has appeared, see French Pat. No. 2 372 752 for example.

SUMMARY OF THE INVENTION

However, it never occured to people that the shape of the cavity could have an effect on cracks forming. When cavities have been specially dug for such storage the shape of the cavity has been determined to facilitate digging, working conditions, traffic, and earth removal.

According to the present invention, a cavity for storing products at low temperature, i.e. at a temperature below the temperature at which the surrounding ground water solidifies, is made with as rounded a shape as possible.

Because of the limited strength of the ground, the height of such a cavity may not exceed a few meters, so to obtain the desired volume, the cavity should be in the form of a galery which may be straight or sinuous. The cavity should preferably be of substantially circular section and its ends should be hemispherical.

Spherical tanks and cylindrical tanks having rounded ends for storing all sorts of products are known. But such tanks are metal tanks and the shapes are chosen to withstand internal pressure, or to withstand welding stresses, or for other such reasons. However, up to now, it has never been suggested that the shape of underground cavity provided by the present invention would avoid or considerably reduce the formation of cracks in the ground while said ground is being cooled below the freezing point of the water with which it is impregnated.

BRIEF DESCRIPTION OF THE DRAWING

The sole FIGURE of the accompanying drawing is a diagrammatic cross section through an underground storage cavity in accordance with the invention.

MORE DETAILED DESCRIPTION

A cavity 10 has a circular section or a substantially circular section in which rounded portions are interconnected by straight segments. The cavity has ends 11 and 12 which are hemispherical in shape. The cavity is connected to the outside by a well 15 and includes a sump 16. The well may be connected to the cavity by means of the device described in the Applicants' French Pat. No. 82 01447. By way of example, three conduits 21, 22, and 23 are shown leading from the inside of the cavity to beyond a plug 17 closing the well 15. The well may also include tubes and cables connected to various probes, sondes and other measuring or monitoring instruments (responsive to temperature, pressure, liquid level, etc.). The conduits 21 and 22 may be used for initially cooling the cavity. A cold gas, e.g. nitrogen, is injected via the conduit 21. Alternatively, a cavity could be cooled by using two wells, one at each end of the cavity.

While the temperature is falling, (initial cavity cooling), the walls are monitored to detect the formation of cracks, if any, and to take appropriate action for closing them should the need arise. The particular shape of the cavity in accordance with the invention considerably reduces the causes that give rise to cracking: in particular cracking which would otherwise be likely to occur at the angular joins between a floor and vertical wall portions.

Once the service temperature has been reached, liquified gas is inserted into the cavity, e.g. via a tube such as the conduit 21. The liquid level varies as the gas is used. The liquid is covered by gas at the same temperature, which is the equilibrium temperature between liquid and vapour at the pressure inside the cavity.

The ground surrounding the cavity is frozen, and the frozen zone extends progressively so long as the cavity is in operation. If the cavity is not very deeply sited, an equilibrium temperature profile will eventually be established between the cavity temperature and surface temperature.

Naturally, the implementation of the invention which is described above is only one particular example, and numerous modifications can be made while remaining within the scope of the claims.

We claim:

1. A method for reducing cracks in walls of an underground cavity for storing a product at low temperature, said cavity being dug in water-impregnated ground, and said low temperature being below the temperature at which the ground-impregnating water freezes and at least −40° C., characterized by: digging said cavity to define a plurality of walls exclusively interconnected by curved wall sections such that no angular joints are present and cracks in the ground surrounding and defining the cavity attendant to the freezing of the ground are reduced, progressively lowering the temperature of the cavity to freeze the water-impregnated ground surrounding and defining the cavity and until a predetermined storage temperature is reached, and introducing the product to be stored into the cavity.

2. A method according to claim 1, wherein the cavity is in the form of an elongate galery, horizontally disposed underground, and having a circular cross section and hemispherical ends.

3. An installation for storing a product at low temperature in an underground cavity dug in water-impregnated ground and in a manner to reduce cracks in walls of the underground cavity, said low temperature being below the temperature at which the ground-impregnating water freezes and at least $-40°$ C., characterized by: said cavity being unlined and having a plurality of walls exclusively interconnected by curved wall sections such that no angular joints are present and cracks in the ground surrounding and defining the cavity attendant to the freezing of the ground are reduced.

4. An installation according to claim 3, wherein the cavity is is in the form of an elongate galery, horizontally disposed underground, and having a circular cross section and hemispherical ends.

* * * * *